(12) United States Patent
Bergsten

(10) Patent No.: US 6,931,566 B2
(45) Date of Patent: Aug. 16, 2005

(54) SYSTEM AND METHOD FOR OPTIMIZING FAULT TOLERANT STORAGE CONTROLLERS

(75) Inventor: James R. Bergsten, Danville, CA (US)

(73) Assignee: LSI Logic Corporation, Milpitas, CA (US)

( * ) Notice: Subject to any disclaimer, the term of this patent is extended or adjusted under 35 U.S.C. 154(b) by 535 days.

(21) Appl. No.: 10/135,585

(22) Filed: Apr. 30, 2002

(65) Prior Publication Data
US 2003/0204770 A1 Oct. 30, 2003

(51) Int. Cl.[7] ............................................. G06F 11/00
(52) U.S. Cl. .......................... 714/5; 714/6; 711/112; 711/114
(58) Field of Search .................... 714/5, 6; 711/112, 711/114; 710/12

(56) References Cited

U.S. PATENT DOCUMENTS 6,487,645 B1 * 11/2002 Clark et al. ................ 711/162
6,543,001 B2 * 4/2003 LeCrone et al. ............... 714/6
6,785,838 B2 * 8/2004 Lim et al. ....................... 714/7
2004/0158673 A1 * 8/2004 Matsunami et al. ......... 711/114
2004/0250019 A1 * 12/2004 Fujie et al. .................. 711/114

* cited by examiner

Primary Examiner—Robert Beausoliel
Assistant Examiner—Yolanda Wilson
(74) Attorney, Agent, or Firm—Suiter West PC LLO

(57) ABSTRACT

A system and method for optimizing fault tolerant storage controllers includes a fault tolerant hardware component comprised of an input interface, at least two output interfaces and, if necessary, a power source connection. The fault tolerant hardware component may be embedded in a storage controller or separately housed within an enclosure. The fault tolerant hardware component may couple with a host information handling system and with two or more storage controllers, which are connected to mass storage devices to form storage arrays. Multiple fault tolerant hardware components can be coupled with a single host information handling system when it includes multiple host ports. Further, the fault tolerant hardware component may be coupled with other fault tolerant hardware components.

17 Claims, 7 Drawing Sheets

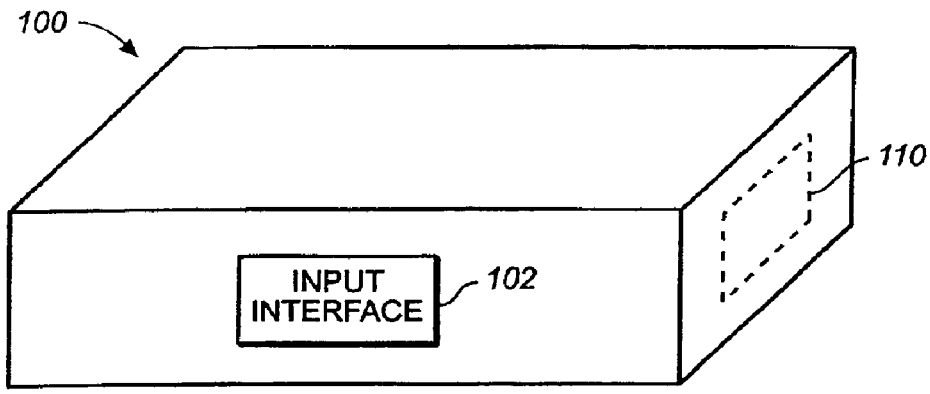
FIG._1A
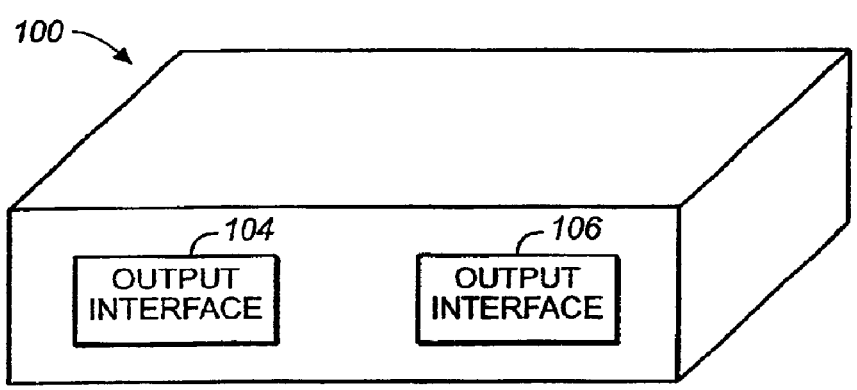
FIG._1B

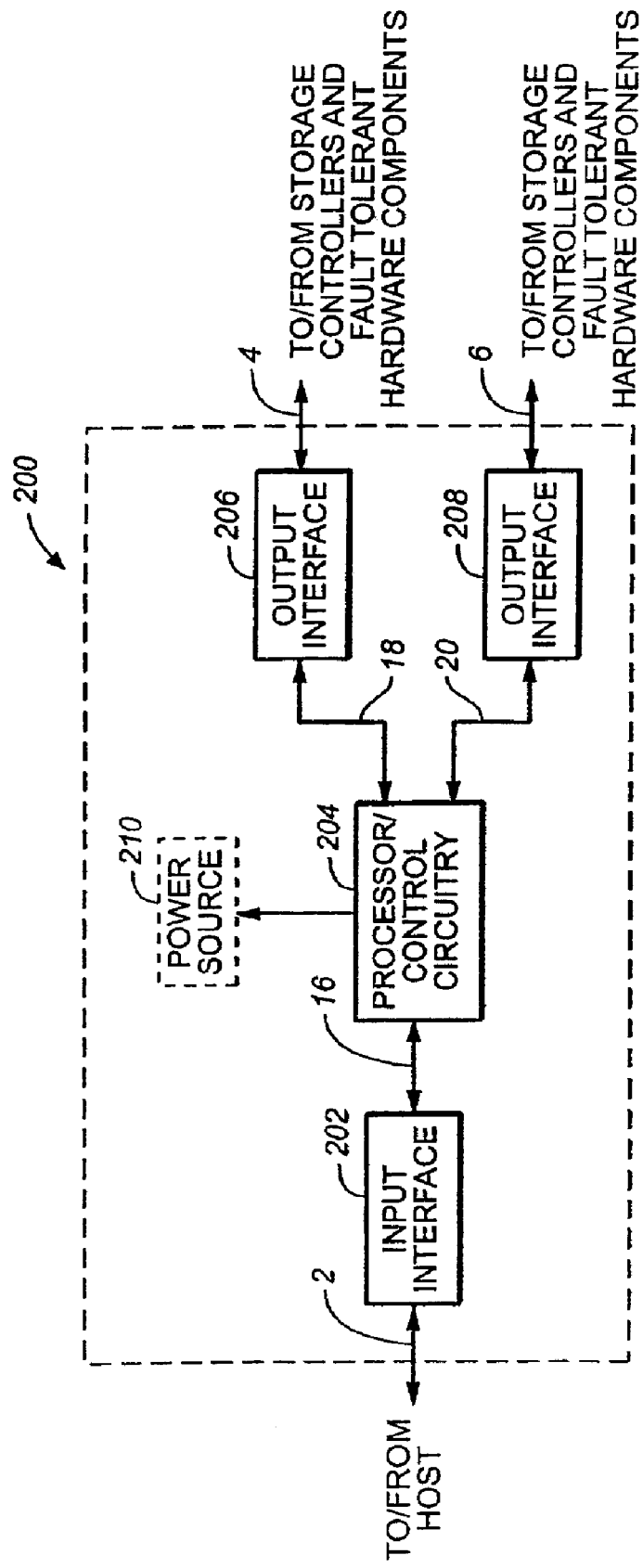
FIG._2A

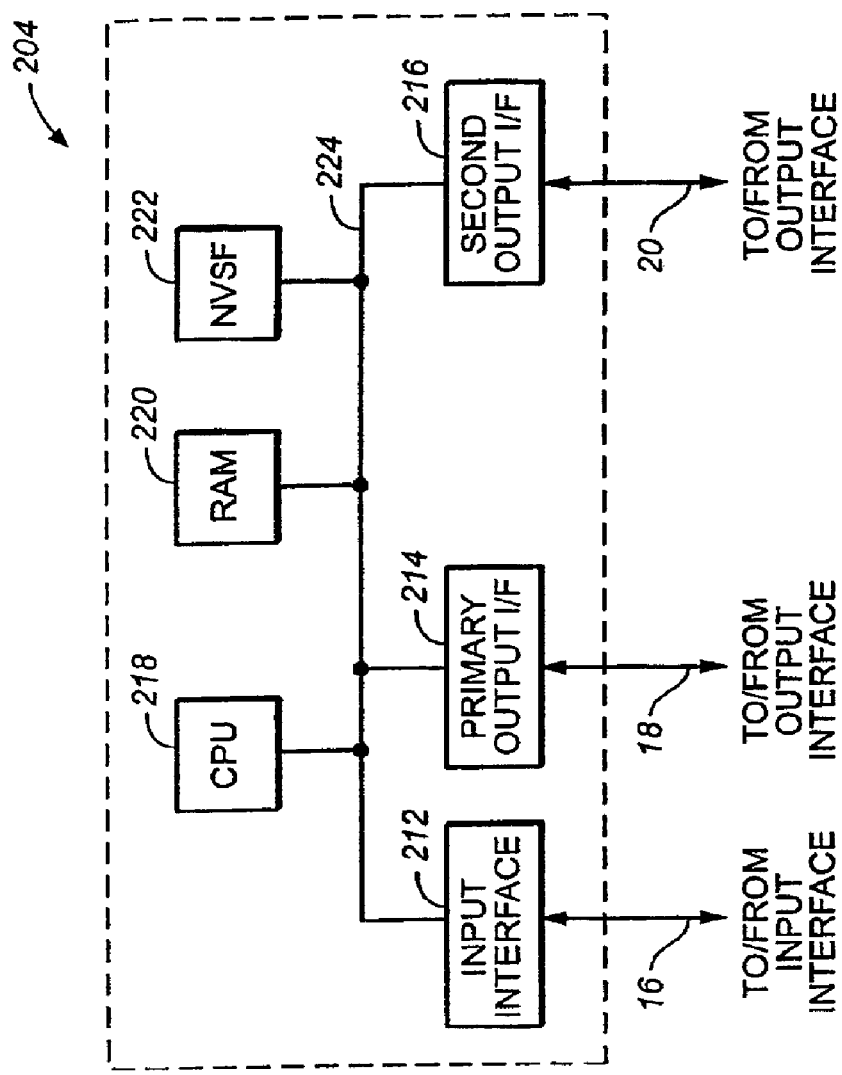
FIG._2B

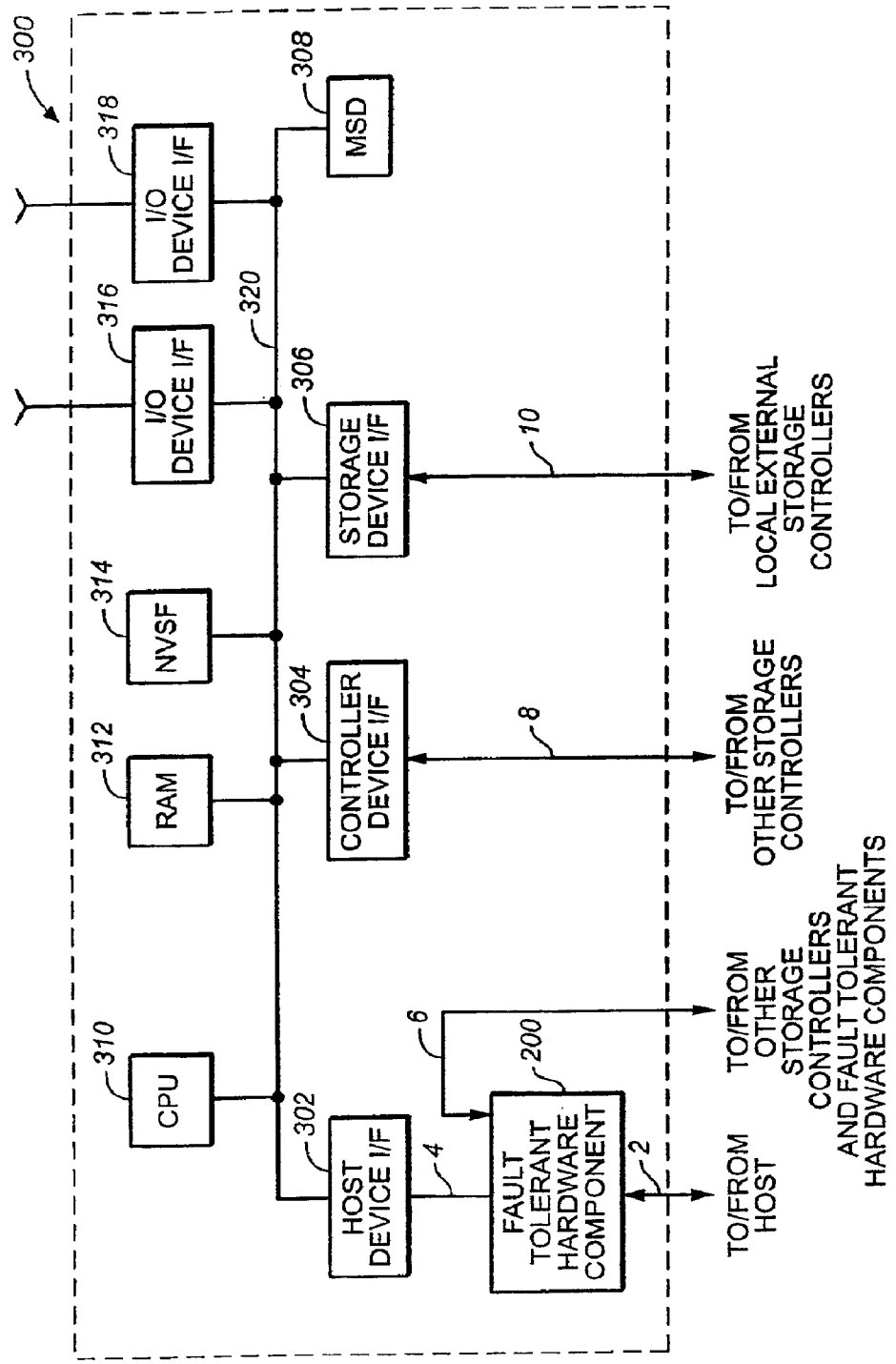
FIG._3

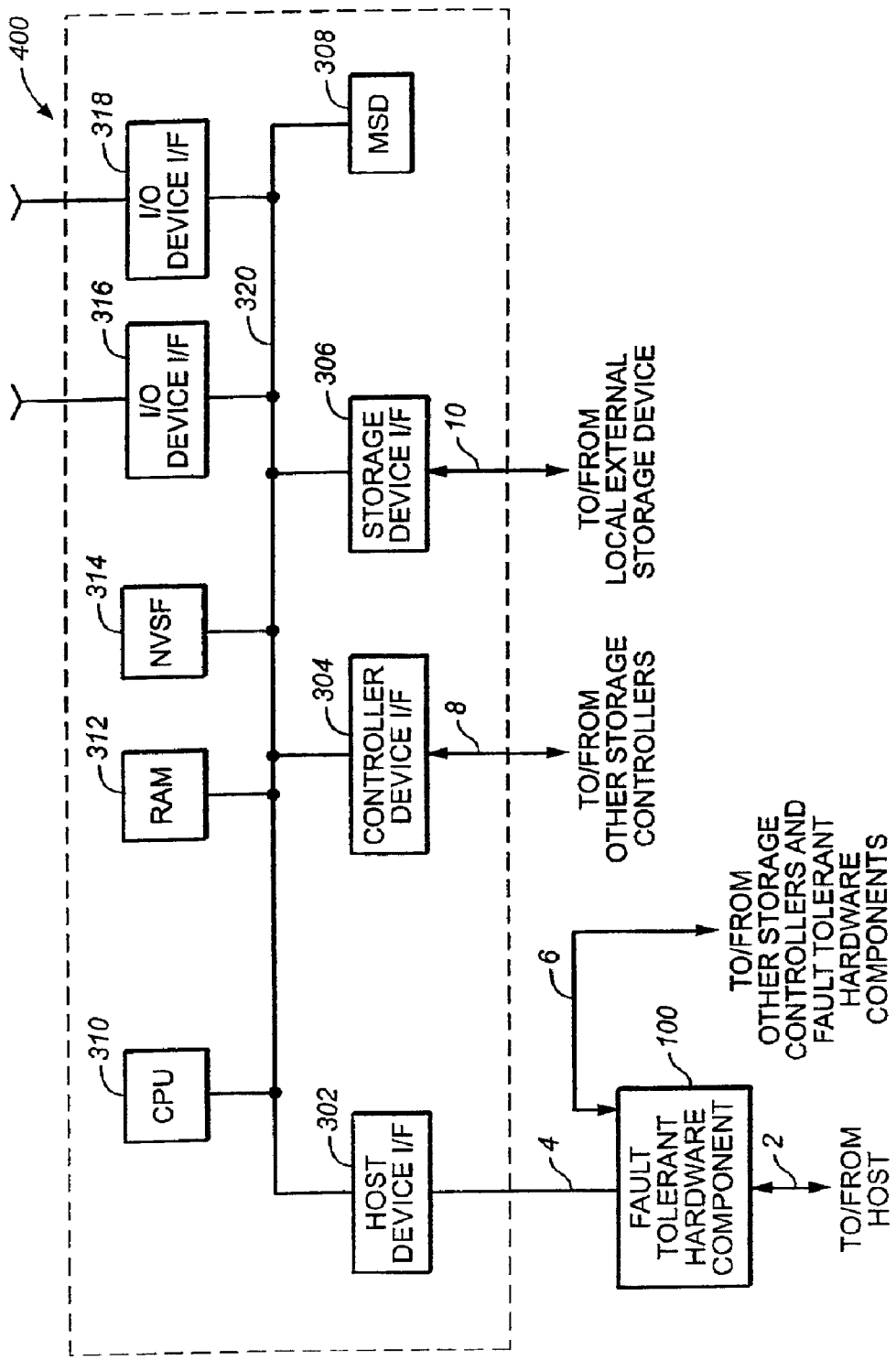
FIG._4

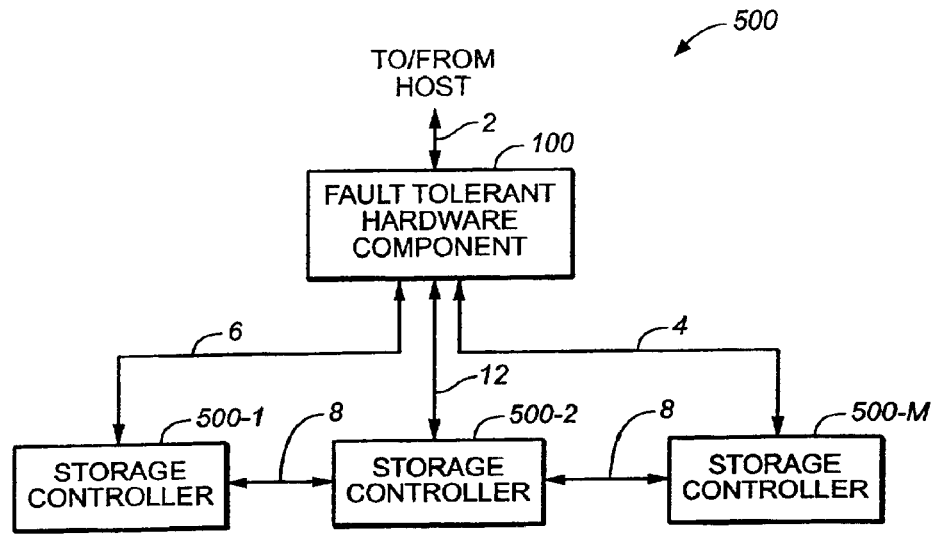
FIG._5
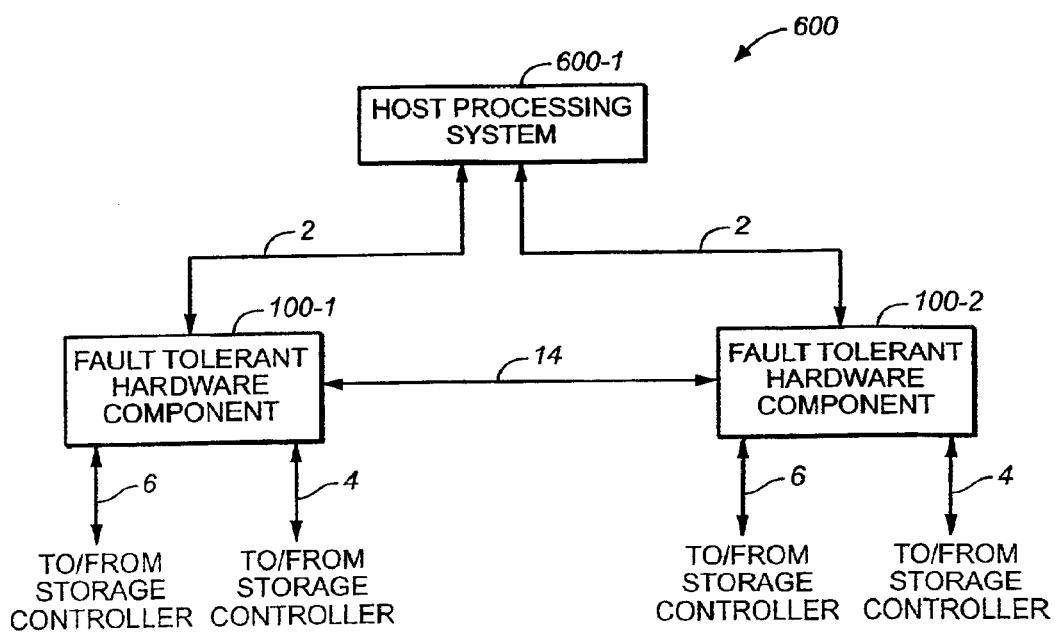
FIG._6

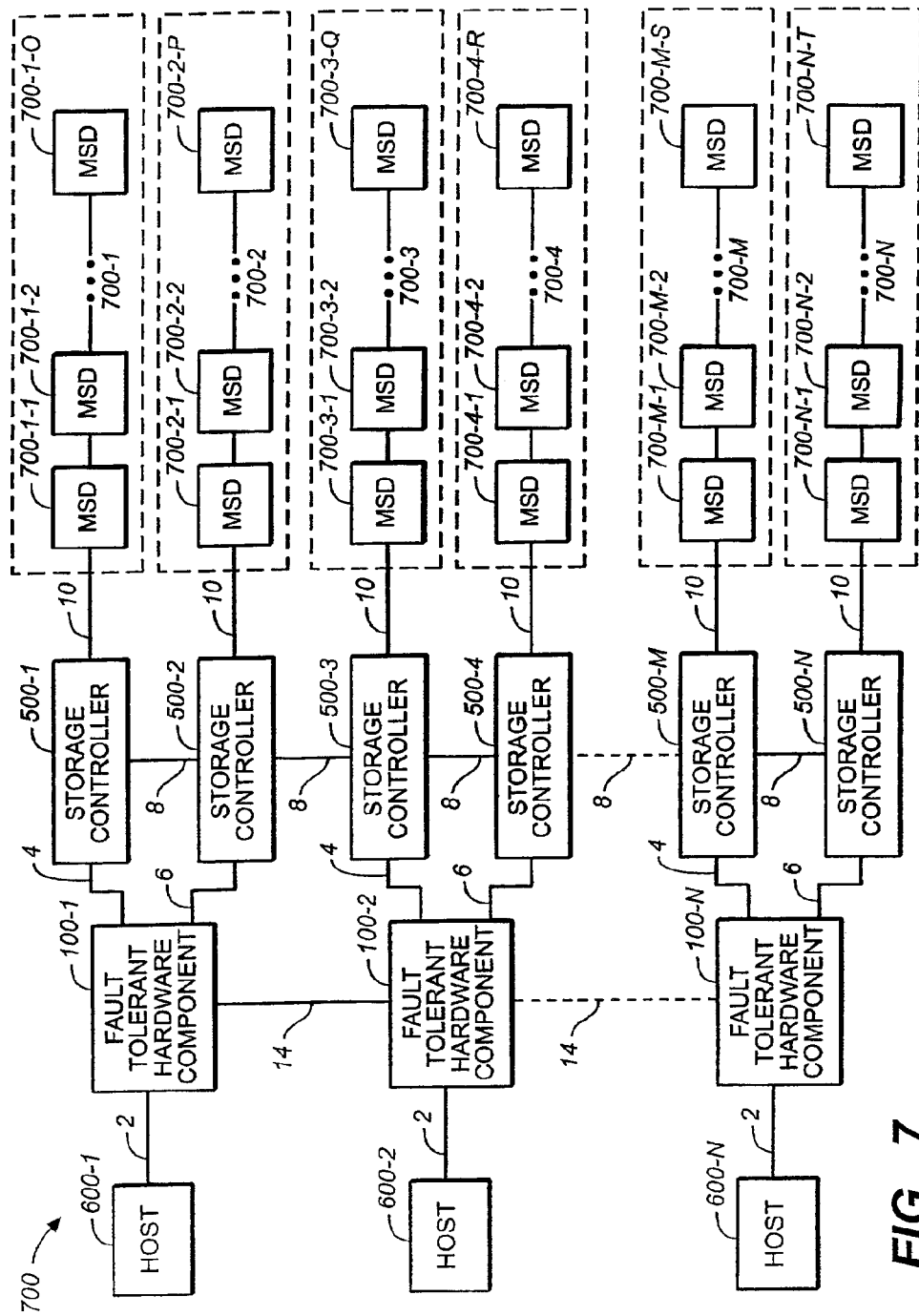
FIG._7

SYSTEM AND METHOD FOR OPTIMIZING FAULT TOLERANT STORAGE CONTROLLERS

FIELD OF THE INVENTION

The present invention pertains to the field of storage systems. More particularly, the present invention relates to devices, which control data flow between one or more host processing systems and one or more data storage subsystems, wherein the data controller provides decreased host transfer latency and faultless data availability.

BACKGROUND OF THE INVENTION

Storage system users are looking for "fault-less," one hundred percent availability to their data. To accomplish this, storage systems are designed with redundant components to minimize or eliminate unrecoverable failures. However, current practice is to receive host data, copy it to redundant storage and then notify the host of successful data transfer. This additional data copy step introduces latency into the host transfer, reducing host input/output (I/O) performance and throughput. Consequently, it is a common practice in attempting to eliminate this latency to introduce "dual ported memory" of some sort. While this may decrease latency, it violates the "no single point of failure" goal because the path to the two memories is in itself a single point of failure.

It is common to store large volumes of data on storage systems, which utilize nonvolatile mass storage devices, such as magnetic or optical disks. These storage systems sometimes handle valuable or irreplaceable data. Data maintained by these storage systems may be of vital importance, for example, in business application such as airline reservations, bank account management, electronic fund transfers, shipping and receiving, inventory control, and the like. Consequently, there is also a need to ensure that the valuable data contained in these storage systems is adequately protected against loss or damage.

Therefore, it would be desirable to provide a fault tolerant hardware component, which provides data protection and reduces host transfer latency, increasing host I/O performance and throughput.

SUMMARY OF THE INVENTION

Accordingly, the present invention is directed to a fault tolerant hardware component that includes a single input interface, at least two or more output interfaces and control circuitry (e.g., a processor). The present invention can be embedded within a storage controller subsystem or placed at a distance from the storage controllers within an enclosure. In operation, the fault tolerant hardware component of the present invention allows a host processing system to transfer data to a storage system, one interface mirrors the data to one storage controller while a separate pass through interface, which maximizes I/O performance and throughput, sends the unaltered protocol and host data to a second storage controller.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description serve to explain the principles of the invention.

BRIEF DESCRIPTION OF THE DRAWINGS

The numerous advantages of the present invention may be better understood by those skilled in the art by reference to the accompanying figures in which:

FIG. 1A is an isometric view illustrating a front plan view of a fault tolerant hardware component enclosure wherein an input interface port and power source connector are included;

FIG. 1B is an isometric view illustrating a back plan view of the fault tolerant hardware component enclosure wherein at least two output interface ports are included;

FIG. 2 is a block diagram illustrating the functional module and interface ports of the fault tolerant hardware component;

FIG. 3 is a block diagram of a storage controller with the fault tolerant hardware component embedded within the subsystem;

FIG. 4 is a block diagram of a storage controller coupled with the fault tolerant hardware component wherein the fault tolerant hardware component is peripherally located to the storage controller;

FIG. 5 illustrates a storage system according to an exemplary embodiment wherein one fault tolerant hardware component is coupled with a plurality of storage controllers;

FIG. 6 illustrates a computing system according to an exemplary embodiment wherein one host processing system is coupled with at least two fault tolerant hardware components; and FIG. 7 illustrates a computing system in which a number of fault tolerant hardware components provide a plurality of host processing systems with access to multiple storage arrays.

DETAILED DESCRIPTION OF THE INVENTION

A system and method for optimizing fault tolerant storage controllers includes a fault tolerant hardware component comprised of an input interface, at least two output interfaces and, if necessary, a power source connection. The fault tolerant hardware component may be embedded in a storage controller or separately housed within an enclosure. The fault tolerant hardware component may couple with a host information handling system and with two or more storage controllers, which are connected to mass storage devices to form storage arrays. Multiple fault tolerant hardware components can be coupled with a single host information handling system when it includes multiple host ports. Further, the fault tolerant hardware component may be coupled with other fault tolerant hardware components.

Reference will now be made in detail to the presently preferred embodiments of the invention, examples of which are illustrated in the accompanying drawings.

FIGS. 1A and 1B illustrate a fault tolerant hardware component enclosure 100. Enclosure 100 includes an input interface 102, a first output interface 104 and a second output interface 106. Further, enclosure 100 may include a power source connector 110, as shown, for connecting enclosure 100 with an external power source. A variety of power sources may be used such as 12V outlets, battery packs, and the like. Further, a variety of connectors such as hard-wired power cords with adapters or even a hard wired enclosure 100 may be used. It is also contemplated that a power source may be disposed within enclosure 100, such as individual battery slots, battery pack slots and the like.

Input interface 102 communicatively couples enclosure 100 with a host information handling system utilizing a Fibre Channel protocol. Input interface 102 is a universal serial bus port and connects with a host port, also a universal serial bus port, located on the host information handling system. This connection may be provided by using serial ports, IEEE 1394 ports (firewire), IrDA (infrared) ports, and the like, as may be contemplated by one of ordinary skill in the art. This coupling opens a communication link using standard SCSI (Small Computer Systems Interface) protocols. Consequently, operation of the fault tolerant hardware component of the present invention does not depend upon the particular hardware or software configuration of any host information handling system as long as the host information handling system is SCSI compatible. Coupling may occur using a variety of industry standard protocols such as serial SCSI, ESCON and the like.

Enclosure 100 may include more than one input interface enabling the fault tolerant hardware component to couple with more than one host information handling system.

First output interface 104 and second output interface 106 communicatively couple fault tolerant hardware component enclosure 100 with two separate storage controllers utilizing a Fibre Channel protocol. These interfaces provide data protection through data redundancy and reduce data transfer latency by separating data copy from data processing. These output interfaces may be an Ethernet, ATM, T1, T3, FDDI adapter or any other suitable device, depending upon the nature of the communication links as will be discussed in FIG. 2. Coupling may occur using a variety of industry standard protocols such as serial SCSI, ESCON and the like.

First output interface 104 is a "pass through" interface, which couples with a primary storage controller. This pass through interface allows unaltered protocol and host data to flow freely to the primary storage controller. The primary storage controller is not aware that the fault tolerant hardware component enclosure 100 is installed between it and the host information handling system does not include a data copy function. Thus, there is no data copy latency through this port and host I/O performance and throughput are not decreased.

Second interface port 106 is a data "mirror" port. It connects with a second storage controller and mirrors data from the host information handling system to the second storage controller. Consequently, as the second storage controller monitors the host data through the mirror port, the second storage controller places the host data into a cache resulting in data protection through duplication and provides for faultless data availability to the operator of the host information handling system. Even if the primary storage controller should experience a total failure and lose all data, there is a full and complete backup copy of all data accessible through the second storage controller.

Fault tolerant hardware component enclosure 100 may include more than two output interfaces. Another interface would communicatively couple another storage controller and thus increase data protection through further data redundancy. Fault tolerant hardware component enclosure 100 includes hardware architecture as described in FIGS. 2A and 2B.

FIGS. 2A and 2B illustrate logical block diagrams of the hardware architecture of the fault tolerant hardware component 200 and the processor 204. Fault tolerant hardware component 200 includes an input interface 202, a processor/control circuitry 204, a first output interface 206, a second output interface 208 and a power source 210. The power source may be located internally or be peripheral and connected to the fault tolerant hardware component 200 as discussed in FIG. 1. Processor/control circuitry 204 includes a central processing unit (CPU) 218, a random-access memory (RAM) 220 and a non-volatile storage facility (NVSF) 222, each of which is coupled to a bus 224. Bus 224 may represent multiple physical or logical buses, which may be interconnected by various adapters and/or controllers. NVSF 222 may be, or may include, a read-only memory (ROM), a programmable read-only memory (PROM), an electrically erasable programmable read-only memory (EEPROM) and the like. Also coupled to bus 224 are a input interface 212, a primary output interface 214 and a second output interface 216.

Input interface 202 connects communication path 2 to fault tolerant hardware component 200. This allows fault tolerant hardware component 200 to communicatively couple with a host information handling system. In this way data transfer from the host information handling system to fault tolerant hardware component 200 is enabled.

Communication path 16 enables input interface 202 to transmit the data to processor 204. Input interface 212 of processor 204 connects communication path 16 to processor 204. Bus 224 enables the data received at input interface 212 to be controlled by CPU 218. CPU 218 includes operational instructions with regards to receipt of data from a host information handling system and directs the flow of data. CPU 218 operatively enabled through RAM 220, through bus 224, directs the data to the primary output interface 214 and the second output interface 216.

Primary output interface 214 connects a communication path 18 to processor 204. Communication path 18 enables processor 204 to connect with output interface 206. Output interface 206, the pass through interface, connects communication path 4 to fault tolerant hardware component 200. Communication path 4 enables fault tolerant hardware component 200 to communicatively couple with the primary storage controller. Consequently, unaltered protocol and host data from the host information handling system is passed through to the primary storage controller.

Second output interface 216 connects a communication path 20 to processor 204. Communication path 20 enables processor 204 to connect with output interface 208. Output interface 208, the data mirror interface, connects communication path 6 to fault tolerant hardware component 200. Communication path 6 enables fault tolerant hardware component 200 to communicatively couple with the second storage controller. Consequently, the host data is mirrored to the second storage controller providing data protection through redundancy.

FIG. 3 illustrates the hardware architecture of a storage controller 300 of the present invention according to one embodiment. Storage controller 300 includes a CPU 310, a RAM 312, a NVSF 314, a mass storage device (MSD) 308, each of which is coupled to a bus 320. Bus 320 may represent multiple physical or logical buses, which may be interconnected by various adapters and/or controllers. NVSF 314 may be, or may include, a read-only memory (ROM), a programmable read-only memory (PROM), an electrically erasable programmable read-only memory (EEPROM) and the like. MSD 308 may be any conventional device that is suitable for non-volatile storage of large volumes of data such as a magnetic disk or tape, an optical storage device such as CD-ROM (Compact Disc-ROM), CD-R (CD-recordable), DVD (Digital Versatile Disc), a magneto-optical (MO) device and the like. Also coupled to bus 320 are a storage device interface 306, a controller device interface 304 and input/output (I/O) device interfaces 316 and 318. I/O device interfaces 316 and 318 are also coupled to separate, external connectors on storage controller 300. A host device interface 302 is coupled to bus 320 as well as fault tolerant hardware component 200 via communication link 4.

In the preferred embodiment fault tolerant hardware component 200 is embedded in storage controller 300. Consequently, fault tolerant hardware component 200 connects communication path 2 to storage controller 300, which enables a host information handling system to be connected to storage controller 300. It may be contemplated that host device interface 302 may connect a host information handling system directly to storage controller 300 and then connect a communication path to fault tolerant hardware component 200. In such an instance bus 320 would be connected to fault tolerant hardware component 200.

In the present embodiment fault tolerant hardware component 200 is also coupled to a separate, external connector on storage controller 300, which connects communication path 6 to fault tolerant hardware component 200. Communication path 6 can connect other storage controllers to fault tolerant hardware component 200. Consequently, other storage controllers may be locally or remotely located with respect to storage controller 300 in which fault tolerant hardware component 200 is embedded. The connector for communication path 6 may be an Ethernet, ATM, T1, T3, FDDI adapter or any other suitable device, depending upon the nature of communication path 6. Communication path 6 allows connected storage controllers to signal successful receipt of data, and successful or unsuccessful destage of the data. Additionally, in the case of one storage controller failing, one of the other storage controllers may signal fault tolerant hardware component 200 to transfer the pass through communication path 4 (or return it to the original storage controller once it has been repaired).

Controller device interface 304 connects communication path 8 to bus 320 in order to connect a remote storage controller. Controller device interface 304 may be an Ethernet, ATM, T1, T3, FDDI adapter or any other suitable device, depending upon the nature of the communication path 8.

Storage device interfaced 306 connects communication path 10 to bus 320 in order to connect external storage devices. Storage device interface 306 may be an Ethernet, ATM, T1, T3, FDDI adapter or any other suitable device, depending upon the nature of the communication path 10.

I/O device interfaces 316 and 318 may be used to connect a keyboard and a monitor to bus 320. I/O interface 316 and 318 may therefore be used by a systems administrator to perform various functions, such as initially configuring storage controller 300, inputting commands and control information to storage controller 300 or obtaining status information from storage controller 300. Further, these interfaces 316 and 318 can be used to remotely perform these same functions on a remote storage controller via (local) storage controller 300 and communication path 8.

FIG. 4 generally illustrates the storage controller described in FIG. 3 except that in this preferred embodiment the fault tolerant hardware component is fault tolerant hardware component enclosure 100 and is located externally of storage controller 400. The ability to place fault tolerant hardware component enclosure 100 some distance from storage controller 400 provides a measure of facility protection. Further, it potentially eliminates electrical coupling among the host information handling system and storage controller 400. This provides another measure of protection.

FIG. 5 illustrates a fault tolerant hardware component 100 with multiple output interfaces connecting multiple communication paths 4, 6 and 12. These communication paths connect multiple storage controllers 500-1, 500-2 through 500-N. It is contemplated that any number of output interfaces may be included within fault tolerant hardware component 100 connecting any number of storage controllers. Fault tolerant hardware component 100 may also be embedded fault tolerant hardware component 200 (as shown and described in FIG. 3). Storage controller 300, of FIG. 3, may include any number of separate, external connectors, which can couple any number of other storage controllers to fault tolerant hardware component 200.

Communication path 8 communicatively couples the storage controllers to one another. The primary use of communication path 8 is for secondary storage controller(s) to signal the primary storage controller of successful receipt of mirrored data. The present invention provides a system where the host writes data, which is mirrored to the secondary storage controller(s). The secondary controller(s) will signal the primary controller that the data has been successfully received. Upon receipt of this signal the primary controller sends an "end of operation" to the host. However, if the secondary controller(s) do not signal successful receipt in an expected period of time, the primary controller treats the transfer as synchronous, holding off completion until the data is destaged into physical storage. This prevents multiple-failure data loss as the host does not proceed until the data is in the physical storage device, if the state of the mirrors cannot be ascertained. A similar operation occurs if the secondary controllers signal unsuccessful receipt of data.

FIG. 6 illustrates a computing system 600 in which multiple fault tolerant hardware component enclosures 100-1 through 100-N are connected to a single host information handling system 600-1 with multiple host ports. Communication path 2 connects multiple fault tolerant hardware component enclosures 100-1 through 100-N with the host information handling system 600-1. The connector for communication path 2 may be an Ethernet, ATM, T1, T3, FDDI adapter or any other suitable device, depending upon the nature of communication path 2.

Each fault tolerant hardware component enclosure, of the present embodiment, is coupled to another fault tolerant hardware component enclosure via a communication link 14 through an external connector. A portion of a communication link 14 between two geographically separated fault tolerant hardware components may be provided by a local area network (LAN), such as a Fast Ethernet while other portions of the link 14 can be implemented as an ATM (Asynchronous Transfer Mode) link, a T1 or T3 link, and FDDI (Fiber Distributed Data Interface) link, Ir (Infrared), or any other suitable type of link. Additionally, each fault tolerant hardware component enclosure is coupled to at least two storage controllers via communication links 4 and 6. These links may follow the same guidelines as mentioned above.

Any number of fault tolerant hardware component enclosures may be connected to a host information handling system. They may be connected in a daisy chain configuration or another configuration as contemplated by one of ordinary skill in the art. Such multiplicity provides redundancy in case of failure of one of the fault tolerant hardware component enclosures.

FIG. 7 illustrates a computing system in which a number of fault tolerant hardware components of the present invention provide a number of host information handling systems with access to a number of storage arrays. Specifically, the computing system includes N fault tolerant hardware components, 100-1 through 100-N; N host information handling systems, 600-1 through 600-N, which are coupled to fault tolerant hardware components 100-1 through 100-N, respectively. The computing system further includes N storage controllers, 500-1 through 500-N, which are coupled to fault tolerant hardware components 100-1 through 100-N, respectively; and N storage arrays, 700-1 through 700-N, which are coupled to storage controllers, 500-1 through 500-N, respectively. Each of the storage arrays includes a number of mass storage devices (MSDs) coupled to a storage controller in a daisy chain configuration. Specifically, storage array 700-1 includes O MSDs, 700-1-1 through 700-1-O; storage array 700-2 includes P MSDs, 700-2-1 through 700-2-P; storage array 700-3 includes Q MSDs, 700-3-1 through 700-3-Q; storage array 700-4 includes R MSDs, 700-4-1 through 700-4-R; storage array 700-M includes M MSDs, 700-M-1 through 700-M-S; and storage array 700-N includes N MSDs, 700-N-1 through 700-N-T.

As discussed in FIG. 6 each fault tolerant hardware component enclosure is coupled to another fault tolerant hardware component enclosure via a communication link 14. A portion of a communication link 14 between two geographically separated fault tolerant hardware components may be provided by a local area network (LAN), such as a Fast Ethernet while other portions of the link 14 can be implemented as an ATM (Asynchronous Transfer Mode) link, a T1 or T3 link, and FDDI (Fiber Distributed Data Interface) link, Ir (Infrared), or any other suitable type of link. Additionally, each fault tolerant hardware component enclosure is coupled to at least two storage controllers via communication links 4 and 6. These links may follow the same guidelines as mentioned above.

A use of communication path 14 is for secondary storage controller(s) to signal the primary storage controller of successful receipt of mirrored data. The present invention provides a system where the host writes data, which is mirrored to the secondary storage controller(s). The secondary controller(s) will signal the primary controller that the data has been successfully received. Upon receipt of this signal the primary controller sends an "end of operation" to the host. However, if the secondary controller(s) do not signal successful receipt in an expected period of time, the primary controller treats the transfer as synchronous, holding off completion until the data is destaged into physical storage. This prevents multiple-failure data loss as the host does not proceed until the data is in the physical storage device, if the state of the mirrors cannot be ascertained. A similar operation occurs if the secondary controllers signal unsuccessful receipt of data.

Note that any of the data communication paths 2, 4, 6, 8, 10 and 14 may actually include two or more redundant, physical paths. Therefore, a failure of any single physical connection does not affect the ability to access any stored data. Communication pathways 2, 4, 6, 8, 10 and 14 in other embodiments, may be configured for a variety of protocols and standards, such as serial SCSI, Fiber Channel, DAFS (direct access file system), CIFS (common internet file system/services), AppleTalk, Netware, NFS (networked file system), ESCON (enterprise system connection) and the like. Communication pathway 12, as discussed in FIG. 5, may also be configured for a similar variety of protocols and standards.

Each of the storage controllers is coupled to another storage controller via a communication link 8. This is an independent pathway of communication and allows them to signal successful receipt of data and successful or unsuccessful destage of data. Further, in the case of one storage controller failing, one of the others can signal the fault tolerant hardware component to transfer the "pass through" path (or return it to the original storage controller once it has been repaired). These links may follow the guidelines mentioned above, in this figure, in the discussion of the fault tolerant hardware components.

Each of the host information handling systems may be any conventional information handling system such as a personal computer, a mini-computer, a mainframe and the like. In addition, any of the host information handling systems may function as a server for one or more client information handling systems (not shown).

Each MSD may include a non-volatile facility for storing large volumes of data, such as a magnetic disk or tape, an optical storage device such as CD-ROM (Compact Disc-ROM), CD-R (CD-recordable), DVD (Digital Versatile Disc), a magneto-optical (MO) device and the like. The MSDs within the computing system need not be of the same device type. That is, the MSDs in any given storage array may use a different type of storage medium from those in any other storage array.

Each storage array may be located geographically distant from the other storage arrays. Multiple copies are generally maintained on different, geographically-separated storage arrays. Hence, the loss of one or more MSDs in a given storage array will not result in the complete loss of data. With respect to a given (local) fault tolerant hardware component, any or all of the other (remote) fault tolerant hardware components and storage controllers, host information handling systems and storage arrays may therefore be located at distant locations to the local storage controller.

Each fault tolerant hardware component communicates with its local host information handling system, storage controller and storage array utilizing standard SCSI (Small Computer Systems Interface) protocols. Consequently, operation of a fault tolerant hardware component of the present invention in the manner described herein is not dependent upon the particular hardware of software configuration of any local host information handling system, storage controller or storage array, as long as those devices are SCSI-compatible. However, the data communication links 2, 4, 6, 8, 10 and 14 may conform to other protocols and standards, such as serial SCSI, Fiber Channel, ESCON and the like. Thus, because data communication links 2, 4, 6, 8, 10 and 14 are conventional interfaces, a fault tolerant hardware component of the present invention can be used concurrently with host information handling systems, storage controllers and MSDs having different configurations. For instance, one host information handling system in the system may be a mainframe computer while another host information handling system is a personal computer. Similarly, one storage array in the system may include conventional magnetic hard disk drives while another storage array includes CD-ROM drives. Further, the storage controllers themselves may be of dissimilar configuration in order to accommodate the different storage arrays.

The fault tolerant hardware components, communicatively linked, operate in peer-to-peer relationships with each other when responding to the operational environment. For instance, any fault tolerant hardware component can be designated as the local system. Meaning that in the case of failure of the original local fault tolerant hardware component another, which is communicatively linked can take over its functions permanently or until repairs are made and the original is functioning properly again.

The present invention is not limited to the specific configuration shown in FIG. 7. For example, the system configuration might alternatively include only a single host information handling system, which is coupled to multiple geographically separated fault tolerant hardware components. The fault tolerant components may be a mixture of embedded fault tolerant hardware component within a storage controller and separate fault tolerant hardware component enclosures. It may be contemplated that the storage controller may have a direct link to the host information handling system and then route the data through the fault tolerant hardware component. Other configurations as contemplated by one of ordinary skill in the art do not depart from the spirit and scope of the present invention.

It is believed that the system and method for optimizing fault tolerant storage controllers of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A fault tolerant hardware component to provide decreased host transfer latency and faultless data availability, comprising:
   an input interface suitable for receiving data;
   at least two or more output interfaces suitable for transmitting the data; and
   a processor coupled to the input interface and the at least two or more output interfaces,
   wherein a first output interface is configured for functioning as a data pass through port and a second output interface is configured for functioning as a data mirror port, the fault tolerant hardware component being embedded in a storage controller assembly.

2. The fault tolerant hardware component of claim 1, wherein the input interface connects with a host port, which communicatively couples a host processing system.

3. The fault tolerant hardware component of claim 1, wherein the output interfaces communicatively couple with at least two or more storage controller assemblies.

4. The fault tolerant hardware component of claim 3, wherein the at least two or more storage controller assemblies are communicatively coupled, independent of the fault tolerant hardware component, through one or more communication channels.

5. The fault tolerant hardware component of claim 1, wherein the fault tolerant hardware component is contained in an enclosure.

6. The fault tolerant hardware component of claim 5, wherein the fault tolerant hardware component contained in the enclosure is connected to a power source.

7. A fault tolerant hardware component to provide decreased host transfer latency and fault less data availability, comprising:
   an enclosure;
   a power source coupled with the enclosure;
   an input interface, included in the enclosure, suitable for receiving data;
   at least two or more output interfaces, included in the enclosure, suitable for transmitting the data; and
   a processor, included in the enclosure, coupled to the input interface and the at least two or more output interfaces,
   wherein a first output interface is configured for functioning as a data pass through port and a second output interface is configured for functioning as a data mirror port, the enclosure being embedded in a storage controller assembly.

8. The fault tolerant hardware component of claim 7, wherein the input interface connects with a host port, which communicatively couples a host processing system.

9. The fault tolerant hardware component of claim 7, wherein the output interfaces communicatively couple with at least two or more storage controller assemblies.

10. The fault tolerant hardware component of claim 9, wherein the at least two or more storage controller assemblies are communicatively coupled, independent of the fault tolerant hardware component, through one or more communication channels.

11. The fault tolerant hardware component of claim 7, wherein the enclosure is connected to a power source.

12. A storage controller assembly, comprising:
   a housing suitable for encompassing the storage controller assembly;
   a fault tolerant hardware component included in and communicatively coupled with the storage controller assembly;
   an input interface, communicatively coupled with a host processing system, suitable for receiving data;
   at least two or more output interfaces, communicatively coupled with at least two or more storage controller assemblies, suitable for transmitting the data; and
   a processor communicatively coupled to the input interface and the at least two or more output interfaces,
   wherein a first output interface is configured for functioning as a data pass through port and a second output interface is configured for functioning as a data mirror port, the fault tolerant hardware component being contained in an enclosure that is embedded in the storage controller assembly.

13. The storage controller assembly of claim 12, wherein the input interface connects with a host port.

14. The fault tolerant hardware component of claim 12, wherein the at least two or more storage controller assemblies are communicatively coupled, independent of the fault tolerant hardware component, through one or more communication channels.

15. A system, comprising:
   a host information handling system;
   a fault tolerant hardware component communicatively coupled to the host information handling system;
   at least two storage controllers communicatively coupled to the fault tolerant hardware component; and
   a mass storage device communicatively coupled to the at least two storage controllers,
   wherein the fault tolerant hardware component provides data protection and reduces host transfer latency, each of the at least two storage controllers further comprises a housing which is capable of having the fault tolerant hardware component embedded within the housing.

16. The system of claim 15, wherein the fault tolerant hardware component further, comprises:
   an input interface suitable for receiving data;
   at least two or more output interfaces suitable for transmitting the data; and
   a processor coupled to the input interface and the at least two or more output interfaces.

17. The system of claim 16, wherein the fault tolerant hardware component further comprises an enclosure.

* * * * *